UNITED STATES PATENT OFFICE.

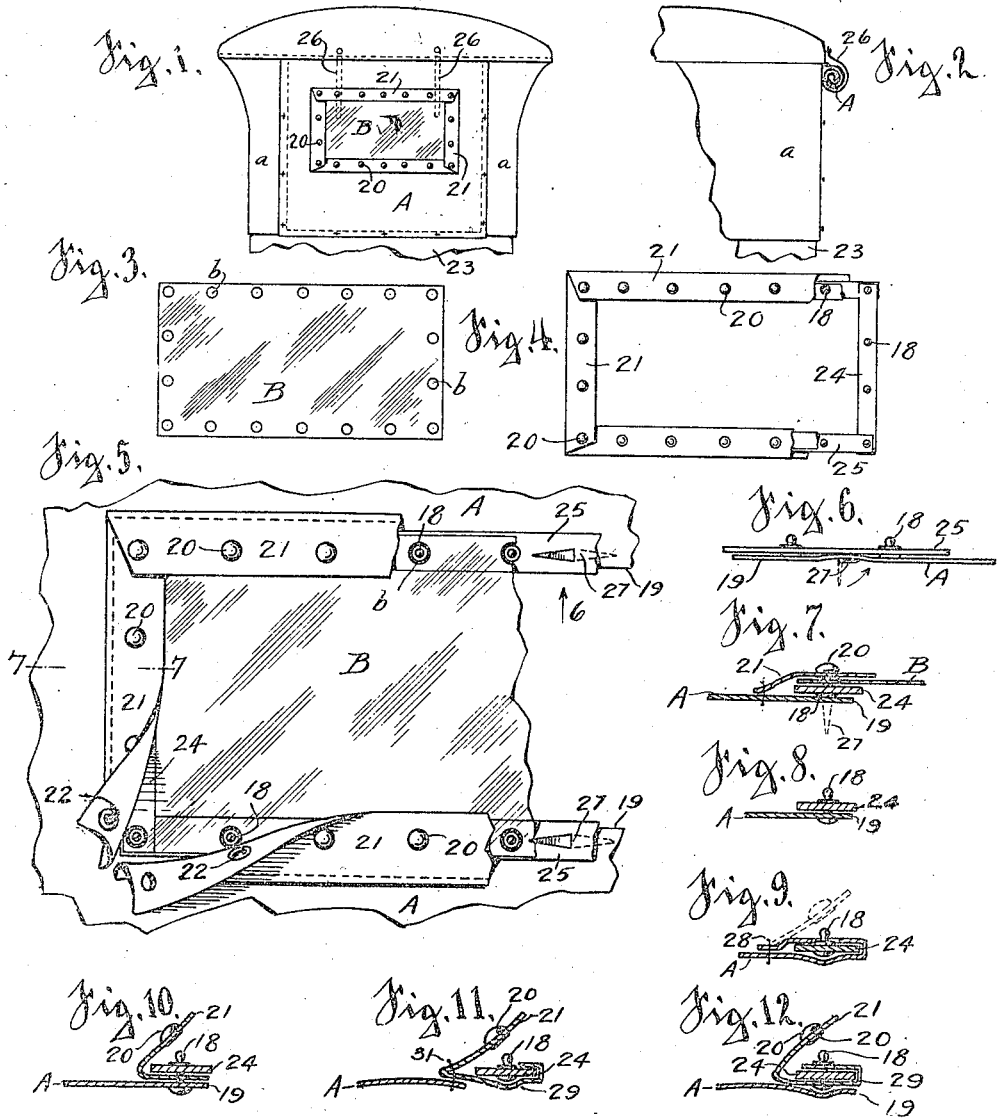

LOUIS BUOB, SR., OF CINCINNATI, OHIO.

CURTAIN-LIGHT FOR VEHICLE-TOPS.

1,242,108.　　　　Specification of Letters Patent.　　　Patented Oct. 2, 1917.

Application filed November 4, 1915. Serial No. 59,578.

*To all whom it may concern:*

Be it known that I, LOUIS BUOB, Sr., residing in Cincinnati, Hamilton county, State of Ohio, have invented certain new and useful Improvements in Curtain-Lights for Vehicle-Tops, of which the following is a clear, full, and exact description, attention being called to the drawing which accompanies this application and forms a part thereof.

The curtains of vehicle tops are usually provided with windows called "lights." These lights consist of sheets of transparent flexible material generally celluloid and at their edges they are connected in various ways to the edges which border the openings in the flexible material of the curtains.

These lights frequently break, particularly those of the rear-curtains of automobile tops, which is due to pressure of air produced by the vehicles when under way. They are also subject to injurious effects when the tops are adjusted, raised or lowered, and when the rear curtains are rolled up.

One object of my invention is to provide certain means which protect a curtain light against such effects and which permit it to be rolled up or unrolled with the curtains, without injury to the material of the light.

Another object of my invention is to provide a construction whereby a curtain light in case damaged or broken so as to require renewal, may be quickly removed and replaced by another one.

The invention consists of the means and construction hereinafter described and claimed and illustrated in the accompanying drawing in which:

Figure 1. shows a rear view of a vehicle-top, the rear curtain being provided with one of my improved lights.

Fig. 2. is part of a side elevation of the top near its rear end.

Fig. 3. shows my improved light at enlarged scale.

Fig. 4. shows a frame which may receive the light and serves to hold the same to the curtain.

Fig. 5. is a view of the light still more enlarged and with parts broken away and illustrates manner of connecting it.

Fig. 6. shows a detail of construction and is an edge view of parts of the preceding figure and shows them as they appear when viewed in the direction of the arrow shown at 6 in Fig. 5.

Fig. 7. is an enlarged cross section taken on line 7—7 of Fig. 5 and illustrates the means for connecting the light and for holding it in position.

Figs. 8, 9, 10, 11 and 12. in similar views show each a modified construction of these light holding means.

The invention is described in connection with the light of the rear curtain of a vehicle top which may be an automobile top. Letter A indicates this curtain and letter B indicates the sheet of transparent and flexible material which constitutes the light. Near its edges this sheet is provided with spaced perforations $b$ to permit application of, or to receive fastening devices whereby it is removably attached to the curtain.

These fastening devices consist preferably of two complementary members which are separable to permit placing of the light after which they are brought together with the edges of the light held between them, the connection of these members to each other being made through the perforations at said edges.

Devices of which one member comprises a short shank adapted to occupy the perforations in the light are used, said shanks being adapted to enter into detachable connection with the other members after the light is placed in position. Devices suitable for the purpose are the well known "snap buttons" or types of buttons similar thereto, manufactured in various styles and sizes and each consisting of a short shank and of a socket member adapted to receive the shank. Connection between the members is a yielding one whereby the shank member and the socket member are pressed into mutual engagement with each other and which engagement is of a character which permits also the connected parts to be pulled apart when positive action is applied. To facilitate this manipulation one of these members is usually in the form of a button the buttons to be applied after the lights are placed in position on the shanks so that these shanks occupy the perforations in these lights. In the present case the shank members, indicated at 18, are provided around the edges 19 of the opening for the light provided in the curtain, and a button member 20 is provided for each shank member.

In the present case snap buttons are used as shown, the manipulation being facilitated by permanently connecting these buttons to strips 21. These strips are permanently connected at one of their longitudinal edges, the connection being made outside of the rows of the shank members 18, so that these strips form flaps which extend inwardly toward edges 19 of the opening for the light and lie in a plane parallel thereto. These strips or flaps are of a width sufficient to overlap the edges of the light and to extend over the shank members which are in engagement with these edges and occupy the perforations therein.

The means for attaching the members of these snap buttons form usually part of them and are of the character of a clench or rivet connection. Button members 20 which are connected to flaps 21 extend through them, the button being on the outer side of the flaps. On its inner or under side each button is provided with a socket 22, adapted to receive the shanks of members 18.

It will now be seen, the complementary members 18 and 20 being properly located with reference to each other, that connection between them may be quickly made.

Certain fixed sizes of the openings for the lights are preferably established and the sheets which make the lights are cut accordingly and sufficiently large so as to extend over the shank members 18 as best shown in Figs. 5 and 7. The location and spacing of these members may also be arranged on a certain plan so that the openings in the edges of the lights may readily meet them. Thus a new light may be quickly placed in position with its edges reaching under flaps 21 and with the openings at said edges in proper registry with the shank members which they are to receive.

After the light is in position flaps 21 are turned over the perforated edges of the light and the button members 20 are pressed into engagement with their complementary shank members below. Disconnection of the fastening members to permit removal of a light is quickly made and the disconnection is accelerated by pulling at the free edges of flaps 21.

Stiffening of the curtain around edges 19 of the light opening not only facilitates insertion of the light but it also prevents their promiscuous bending with the curtain, which has a tendency to break them. For the purpose of such stiffening, I use a frame, preferably of flat metal bars of limited thickness which bars are secured to the curtain and around the edges for the light opening therein. Shank members 18 are secured to these bars, the connection being a riveted one or is effected otherwise as best suited for the character of the particular fastening devices used. Such a frame is also necessary to maintain the fastening devices in their properly spaced and alined relation so as to always meet the perforations in the light and to register with each other when the connection is to be completed.

The rear curtains are sometimes rolled up, as for instance when their use is not desired, as shown in Fig. 2, or when the top is to be lowered, at which time the lower and side edges of the curtain are disconnected from the other parts $a$ of the top and from the body 23 of the vehicle. To prevent interference with this rolling up by the aforesaid frame, the sides or upright members 24 thereof are made of metal of limited thickness, so as to be flexible.

Straps 26 are provided on the tops to retain the rolled-up curtain in position as shown in Fig. 2 and in the present case these straps should be so located as to be within the ends of the light as shown in dotted lines in Fig. 1, so that they pass around the rolled-up frame of the light, thus forming a compact roll which is firmly held to its shape and by rigidly holding the rolled up light, protects the same against injury.

The fastening devices, the flaps, and the frame members are secured in position against one side of the curtains which may be the inside or the outside in any suitable manner, and it is my intention to arrange also for permitting application of my invention to curtains which are already in use. Of course in new work the devices of my invention may be attached to the curtains before the tops are in position on the vehicle which permits the connection to be conveniently effected in a number of various ways.

The shank members are attached to the frame bars as shown in Fig. 6.

The frame bars may be secured to the curtain by means of prongs 27 forced out of the bars as shown in Figs. 5 and 7 (dotted lines) and bent back against the underside of the bars with the material of the curtain clenched between as shown in Fig. 6 and in dotted lines in Fig. 5. This method of connecting the metal frame may be resorted to when it is to be applied to curtains in use. Independent devices may take the place of the prongs.

The shank members may also be secured to the curtains with the frame bars interposed between them so that all three are held together by one connection as shown in Fig. 8.

Or the frame bars with the shank members attached to them may be secured to the curtain by lapping this latter over the frame at the edges around the opening for the light, openings being provided to clear the shanks. The overlapped edges are secured to the curtain beyond the outer edges of the frame bars by sewing as shown at 28, in Fig. 9, or in any other equivalent manner.

Flaps 21 may be secured as shown in Fig. 10, they being of sufficient width to permit being clamped in between the curtain and the frame bars or they may be sewed to the curtain as shown in Figs. 5, 7 and at 28 in Fig. 9 (dotted lines.)

When sewing is resorted to in connection with the attachment of the frame as shown in Fig. 9, the flaps may be secured with the overlapped edges of the curtain as shown in dotted lines in said figure, the same stitching 28 serving for both purposes. The frames with flaps 21 on them all complete may also be independently constructed as shown in Fig. 4 for ready connection to the curtain as a whole and either to new work or to curtains in use.

This construction may be as shown in Fig. 11, where a strip of material 29 (leather or fabric) is secured to the frame bars, by cement for instance and extending beyond the same is turned over to form flap 21.

Or this strip may be secured as shown in Fig. 12, where the rivet connection for attaching shank member 18 is used for the purpose.

Or the connection may be analogous to the manner shown in Fig. 9 for securing the metal frame-bars in position, that is part of the strips, they being of sufficient width, is formed into a pocket which receives the frame-bars.

The bars of the metal frame are joined to each other at their ends at the corners of the frame by solder or rivets. The rivet connection whereby shank members 18 at the corners of the frame are connected may serve for the purpose. Spot welding may take the place of solder or rivets wherever applicable.

The independent frame after so constructed complete may be attached to the curtain in any suitable way, as for instance by sewing as shown at 31 in Fig. 11.

It may also be connected as shown in Fig. 12, the clenched connection shown in Figs. 5, 6 and 7 being resorted to or independent devices like rivets, clasps etc. may be used. Cement may also be used in place of this clenched attachment or in connection therewith.

These latter methods of connecting the frames are best suited where attachment of them is to be made to curtains in use. Cement may be applied to the frame bars in a general way where they contact with the material of the curtain or of the flaps in all the various methods of attachment.

Having described my invention, I claim as new:

1. In a light for a vehicle top curtain which is provided with an opening therefor, the combination of a light of flexible material for this opening and provided with perforations around its edges, a metallic supporting frame for this light which is flexible to permit being rolled up with the curtain and entirely surrounds the light, means to connect this frame against one side of the curtain and along the edges of the opening therein, flaps provided around the outer edges of this frame and adapted to overlap the members thereof with the perforated edges of the light between, and fastening devices, one set provided on the frame and another set complementary thereto provided on the flaps and adapted to engage each other through the perforations in the light so as to hold the same detachably to the frame.

2. In combination with the curtain of a vehicle top which is adapted to be rolled up and is provided with a rectangular opening for a light, a rectangular light of flexible material for this opening, a rectangular supporting frame for this light consisting of metallic bars joined at their edges and connected to the curtain around the light-opening therein so as to extend continuously around all the edges thereof, the upright bars of this frame consisting of flexible metal to permit the frame to be rolled up with the curtain, means to detachably hold the light to this flexible frame and straps adapted to engage the rolled-up frame and to hold the same and the curtain while so rolled up.

3. As an article of manufacture an independent curtain light for a vehicle top, consisting of a flexible metallic frame, means for attaching the same to one side of a curtain so as to extend continuously around all the edges of an opening provided therein for the light, a sheet of flexible transparent material to close this frame and means to detachably connect this sheet to the frame.

4. As an article of manufacture an independent curtain light for a vehicle top which light consists of a metallic frame, of means for attaching this frame to one side of a curtain so as to extend continuously around all the edges of an opening provided in said curtain for the light, a sheet of flexible transparent material to close this frame and having perforations around its edges, fastening flaps provided around the outer edges of this frame and adapted to overlap the same and complementary sets of fastening devices, one set secured to the frame and the other to the flaps and adapted to engage each other through the marginal perforations in the light and with the edges of the light between them so as to detachably hold the same in place.

In testimony whereof I hereunto affix my signature in the presence of two witnesses.

LOUIS BUOB, Sr.

Witnesses:
C. SPENGEL,
A. JOHNSON.